United States Patent [19]

Argazzi

[11] 4,375,275
[45] Mar. 1, 1983

[54] HIGH VISCOSITY PRODUCT DISPENSER

[75] Inventor: Dennis J. Argazzi, Newington, Conn.

[73] Assignee: Loctite Corporation, Newington, Conn.

[21] Appl. No.: 213,484

[22] Filed: Dec. 5, 1980

[51] Int. Cl.³ .............................................. B05B 15/02
[52] U.S. Cl. .................................................... 239/117
[58] Field of Search ............... 239/112, 113, 415, 422, 239/117, 116, 115

[56] References Cited

U.S. PATENT DOCUMENTS 2,236,551  4/1941  Striegel ............................ 239/415 X
2,864,653 12/1958  Liedberg et al. ................. 239/415 X
3,059,859 10/1962  Hupp ..................................... 239/422
3,066,874 12/1962  Becker ................................... 239/415
4,053,283 10/1977  Schneider et al. ............... 239/112 X Primary Examiner—John J. Love
Assistant Examiner—Gene A. Church Attorney, Agent, or Firm—Watson, Cole, Grindle & Watson

[57] ABSTRACT

Apparatus for dispensing material in metered amounts and without clogging includes a body having a material discharge orifice and a discharge valve seat, a hollow valve spindle engageable with the seat for shutting off the flow of material through the orifice, the spindle being retractable against the force of the return spring for opening the orifice to permit flow of material therethrough. A jet of air is discharged through the hollow valve spindle, when the flow of material through the discharge orifice is shut off for removing any material remaining at the discharge orifice. The spindle may project through the orifice, when the flow of material therethrough is shut off, for removing any residual material from the wall of the discharge orifice. And, a coaxial hollow tube for dispensing another material may be provided in the body, such tube forming an annular passage with the spindle for the jet of air, and such tube extending through the orifice for combining the dispensed materials outwardly of the discharge orifice.

7 Claims, 4 Drawing Figures

U.S. Patent  Mar. 1, 1983  4,375,275
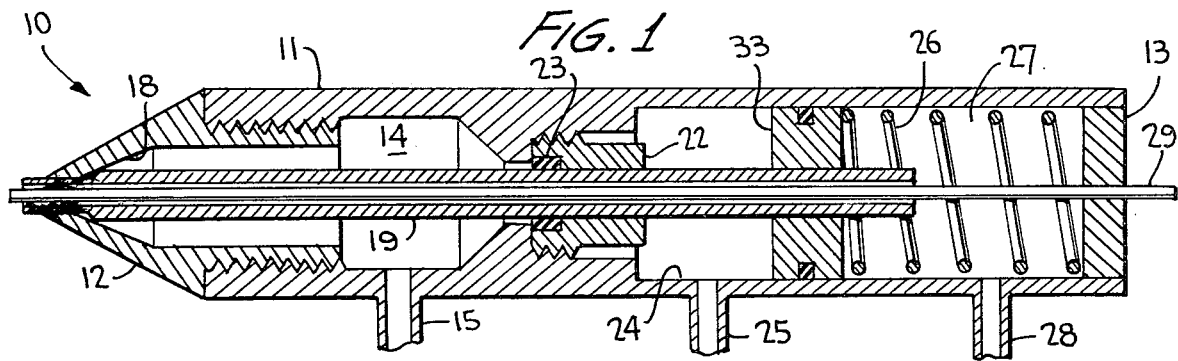
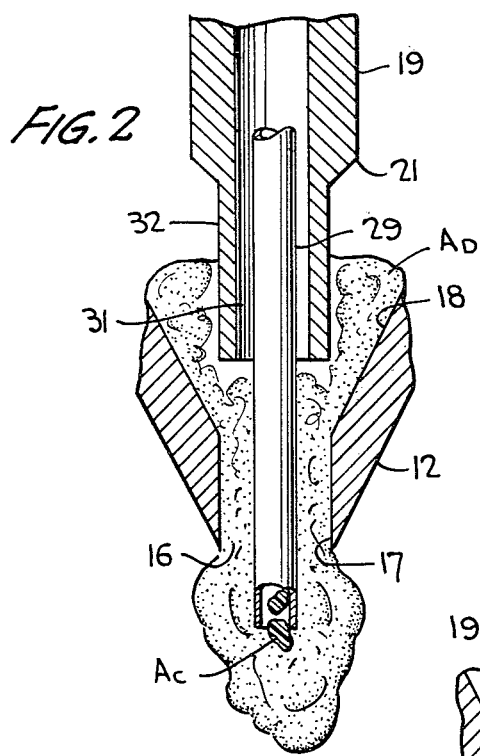
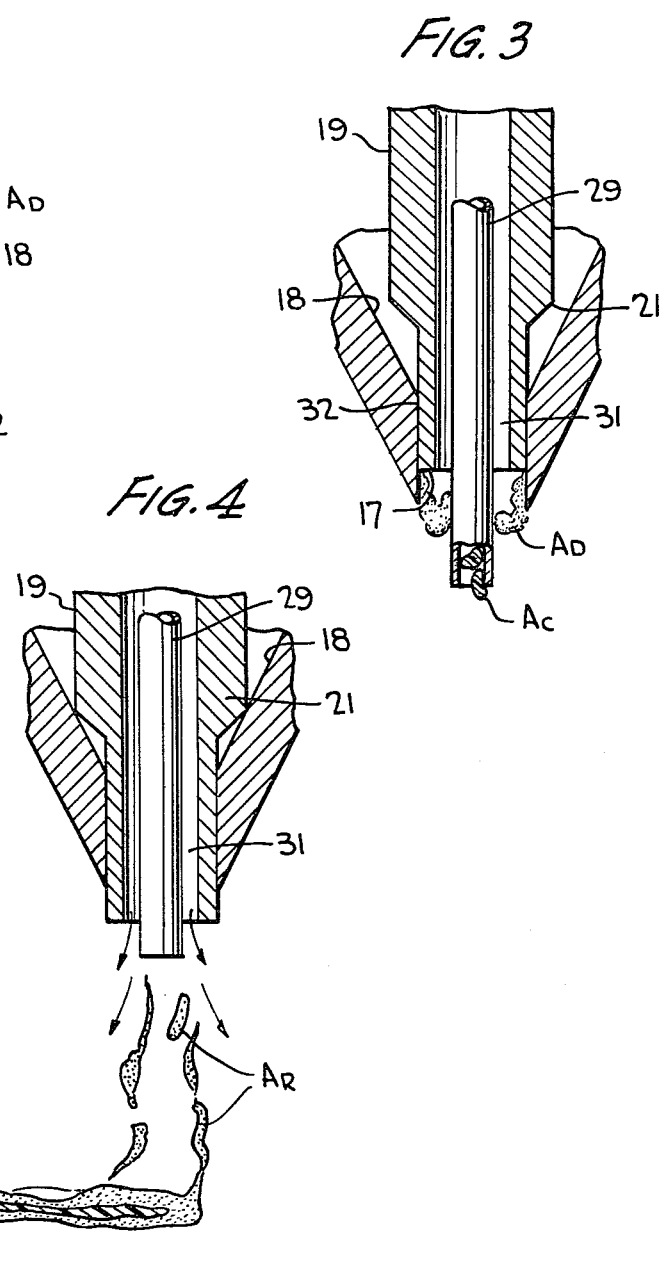

HIGH VISCOSITY PRODUCT DISPENSER

BACKGROUND OF THE INVENTION

This invention relates generally to a dispenser, especially for a high viscosity product, and more particularly to such a dispenser capable of dispensing the product in metered amounts and without clogging as a jet of air is discharged through a hollow valve spindle for removing any product remaining at the discharge orifice.

Difficulties have been encountered during the dispensing of products, especially high viscosity adhesives, because of the "stringing" of the adhesives which develop when being applied to a workpiece. Dispensers which have been used for these purposes typically include a plunger which, when actuated, compresses the adhesive and forces it through a discharge nozzle. However, because of the high viscosity of the material being dispensed, it is difficult to precisely control the metered amount of dispensed product. After a desired quantity of adhesive is applied to the workpiece, the dispensed adhesive continues to cling to the discharge nozzle because of the "stringing" effect which typically occurs. Therefore, the operator must reverse the plunger stroke for suctioning the strings back into the nozzle in an attempt to sever them from the dispenser. Unintended areas of the workpiece may thus be coated by the indiscriminantly falling strings or by residual portions of the adhesive remaining at the nozzle tip. Moreover, the discharge nozzle may become clogged with residual adhesive remaining after repeated use. And, dermatological problems may arise in the event of prolonged skin contact of the adhesive by the operator.

SUMMARY OF THE INVENTION

It is therefore an object of this invention to provide a dispenser, especially for adhesives of high viscosity, which avoids the drawbacks of prior art dispensers in that the adhesives are capable of being metered in controlled amounts without the problems arising from "stringing" as in the past.

The dispenser according to the invention includes a dispenser body having a material discharge orifice and a discharge valve seat, a hollow valve spindle being engageable with the seat for shutting off the flow of material through the orifice, and the spindle being retractable against the force of a return spring in the body for opening the orifice to permit flow of material therethrough. A jet of air is discharged through the hollow valve spindle for removing any material remaining at the discharge orifice after the flow of material therethrough is shut off.

Further, according to the invention, the spindle may project through the discharge orifice for removing any residual material from the wall thereof as the flow of the material therethrough is being shut off.

And, a coaxial hollow tube may be provided for simultaneously dispensing adhesive primers, activators or accelerators during the adhesive dispensing operation, the tube forming an annular passage with the spindle for the jet of air, and extending through the orifice for combining the dispensed materials outwardly thereof.

Other objects, advantages and novel features of the invention will become more apparent from the following detailed description of the invention when taken in conjunction with the accompanying drawings.

BRIEF DESCRIPTION OF THE DRAWINGS

FIG. 1 is a longitudinal sectional view of the dispenser according to the invention;

FIG. 2 is an enlarged longitudinal sectional view of the forward end of the dispenser showing the product discharge orifice in an open position;

FIG. 3 is a view similar to FIG. 2 but with the product discharge orifice in the process of being closed; and FIG. 4 is also a view similar to FIG. 2 but with the product discharge orifice shown completely closed, and the jet of air being discharged therethrough for severing the adhesive strings from the ends of the dispenser.

DETAILED DESCRIPTION OF THE INVENTION

Turning now to the drawings wherein like reference characters refer to like and corresponding parts throughout the several views, the dispenser according to the invention is generally designated 10 in FIG. 1 and includes a generally cylindrical body 11 having a nozzle piece 12 fitted at one end and a fixed end cap 13 at its opposite end. A forward section of the dispenser defines a chamber 14 into which adhesive to be dispensed enters through an inlet 15 connected to an adhesive supply through a pressure pump (not shown). Chamber 14 terminates in a discharge orifice 16 having a wall 17 (FIG. 2), and a conical valve seat 18 extending inwardly from the wall of the orifice. A hollow valve spindle 19 has an annular shoulder 21 adjacent its tip end defining a valve member for valving chamber 14 closed when seated against valve seat 18 as in the position shown in the FIGS. 1 and 4. A retainer element 22 having a spring energized chemically inert seal 23 is mounted within the dispenser body and has a central opening through which the valve spindle extends, the spring energized chemically inert seal permitting movement of the spindle relative to the retainer in a fluid tight manner.

A piston head 33, fixedly secured to a rearward portion of the spindle in any normal manner, operates in a cylinder 24 having an air inlet 25 connected to a source of air under pressure. A return spring 26 extends between the piston head the cap 13 for resiliently urging the head and the attached valve spindle into its discharge closing position of FIGS. 1 and 4. Thus, the pressurized air ported through inlet 25 and into cylinder 24 functions to retract the spindle against the force of the return spring to permit flow of adhesive through an open discharge orifice.

The hollow valve spindle opens at its rearward end into a chamber 27 having an air inlet 28 which may extend from the same pressurized air source extending to inlet 25.

A hollow tube 29 is affixed to end cap 13, extends through the hollow valve spindle, and projects slightly outwardly of the discharge orifice at its forward end. As seen in the drawings, the coaxial tube and spindle define an uninterrupted annular passage 31 extending between opposite ends of the spindle. This passage facilitates air jet flow through the spindle as will be described in more detail hereinafter. And, hollow tube 29 is connected to a supply of adhesive primer, activator or accelerator via a pinch valve (not shown) to facilitate a simultaneous dispensing with the adhesive. It should be pointed out, however, that if an adhesive activator or the like is not to be dispensed, the presence or absence of tube 29 will not affect the adhesive dispensing operation according to the invention.

In operation, the high pressure pump (not shown), associated with the adhesive supply line, delivers the adhesive to chamber 14 via inlet 15 at a supply pressure of about 300 to 500 psi. When the chamber is filled with adhesive, the dispenser is readied for operation.

Pressurized air is then admitted from the air source into cylinder 24 via air inlet 25 and, upon a build-up of air pressure, return spring 26 is overcome and the valve spindle is retracted from its FIG. 1 position that shown in FIG. 2. Shoulder 21 of the valve spindle thus breaks away from its valve seat 18, and the valve spindle continues to retract until its nose end 32 clears wall 17 of the discharge orifice. Pressurized adhesive $A_d$ may now flow outwardly from chamber 14 on to an intended workpiece. At the same time, the air signal which retracted the valve spindle is utilized to open the pinch valve in the activator supply line. Air pressure in the activator supply reservoir then forces activator through the now opened pinch valve and out through the open end of the activator tube 29 as shown at $A_c$ in FIG. 2. At this juncture of the dispensing operation, the activator and adhesive are combined outwardly of the discharge orifice. However, as heretofore mentioned, it may be desirable not to make use of any adhesive activator or accelerator for some special applications.

Adhesive will continue to be discharged through the open discharge orifice, and adhesive activator will continue to be dispensed through tube 29 (in those applications where an activator is desireable), as aforedescribed, until the air signal at air inlet 25 is removed. When such air is removed, the force of the return spring will begin to return the valve spindle toward the valve closing position. And, during the valve closing process, nose end 32 of the valve spindle enters wall 17 of the discharge orifice and continues to move forward so as to clear the orifice wall of any residual adhesive, as in the manner illustrated in FIG. 3. It should be pointed out that the diametral clearance between the nose end of the spindle and wall 17 is may be about 0.0005 inch to 0.001 inch.

The valve spindle continues to move in its forward direction until shoulder 21 seats tightly against valve seat 18 to thereby close the discharge of adhesive from chamber 14 through the discharge orifice, as shown in FIG. 4.

A logic circuit may be provided for the air supplied to an air inlet 28. Thus, when the air signal at air inlet 25 is removed, a NOT logic element in the circuit may be activated. The output signal of this NOT element goes through a delay and is then utilized to activate a DIF logic element. The output of the DIF element may be on an 80 millisecond pulse of air. This pulse of air will then enter chamber 27 via air inlet 28 and will exit through the unobstructed annular passageway 31 formed between the outer diameter of rod 29 and the inner diameter of the valve spindle. This air jet functions to blow any residual adhesive and/or adhesive activator $A_R$ off the end of nozzle 12 and the end of tube 29, as illustrated in FIG. 4. Thus, the residual adhesive, which may be in the form of strings, and residual activator will be effectively cut back to the tip end of the nozzle. It can be therefore seen that the dispensing operation, now complete, is carried out in a quick, clean and efficient manner even for a high viscosity adhesive. Residual adhesive is removed from not only the wall of the discharge orifice, but from the tip end of both the nozzle and the valve spindle. Any residual adhesive activator is likewise removed from the tip end of tube 29. The jet of air exiting through passage 31 cuts any adhesive and/or activator strings back to the tip end of the dispenser, so that metered amounts of product can be neatly and efficiently dispensed on to an intended workpiece.

Obviously, many modifications in the variations of the present invention are made possible in the light of the above teachings. It is therefore to be understood that within the scope of the appended claims the invention may be practiced otherwise than as specifically described.

What is claimed is:

1. An apparatus for dispensing at least one product in the form of an adhesive of high viscosity, comprising a body having a forward section defining a product chamber terminating in a discharge orifice having a wall, and a rearward section defining a pressure cylinder, a hollow valve spindle lying inwardly concentric to said orifice and being slideably mounted in said body, said spindle having a piston operating in said cylinder and a forward end having a control valve engageable with a valve seat surrounding said orifice for controlling product discharge therethrough, said forward end being movable into said orifice into a discharge closing position, said cylinder having a first pressurized air inlet for retracting said forward end away from said orifice to open said orifice against the force of a return spring provided in said body, said chamber having a pressurized product inlet for forcing product through said orifice when opened, and said hollow valve spindle communicating with a second pressurized air inlet for blowing air through said orifice upon discharge closing for removing any product remaining at the outer end of said wall of said discharge orifice having a tendency to string onto said outer end after said one product is discharged.

2. The apparatus according to claim 1, wherein said forward end of said valve spindle projects through said outer end of said wall of said discharge orifice, in said closing position, for removing any residual product from said wall of said orifice during the closing of the product discharge through said orifice.

3. The apparatus according to claim 1 or 2, further comprising a hollow tube fixedly mounted in said body and extending through said hollow valve spindle so as to define an annular passage therewith, the forward end of said tube extending through said discharge orifice and the rearward end of said tube communicating with a pressurized source of another product such as an adhesive activator, accelerator or primer, for combining the dispensed products outwardly of said discharge orifice.

4. An apparatus for dispensing material, in the form of an adhesive of high viscosity in metered amounts and without clogging, comprising a body having a material discharge orifice and a discharge valve seat, a hollow valve spindle lying inwardly concentric to said orifice and being engageable with said seat for shutting off the flow of material through said orifice, means for retracting said spindle against the force of a return spring in said body for opening said orifice to permit flow of material from around said spindle and through said orifice, and means for discharging a jet of air through said hollow valve spindle, when the flow of material through said orifice is shut off, for removing any material having a tendency to string and remain at said discharge orifice.

5. The apparatus according to claim 4, wherein said spindle projects through said orifice, when the flow of material therethrough is shut off, for removing any residual material from the wall of said discharge orifice.

6. The apparatus according to claims 4 or 5, wherein said retracting means include a piston mounted on said spindle, said body defining an air cylinder within which said piston operates, and said cylinder having a pressurized air inlet.

7. The apparatus according to claims 4 or 5, further comprising a coaxial hollow tube fixedly mounted within said body for dispensing another material, in the form of an adhesive activator, accelerator or primer, and extending through said spindle so as to form an annular passage therewith for the jet of air, said tube projecting through said orifice for combining the dispensed materials outwardly of said discharge orifice.

* * * * *